(12) United States Patent
Schulte et al.

(10) Patent No.: US 7,291,943 B2
(45) Date of Patent: Nov. 6, 2007

(54) LINEAR GENERATOR WITH A SWINGING PISTON

(75) Inventors: Franz Josef Schulte, Olsberg (DE); Richard Matthias Knopf, Vienna (AT)

(73) Assignees: Otag GmbH & Co. KG, Olsberg (DE); Bütton Energy Energiesysteme GmbH, Vienna (AT)

( * ) Notice: Subject to any disclaimer, the term of this patent is extended or adjusted under 35 U.S.C. 154(b) by 0 days.

(21) Appl. No.: 10/497,755

(22) PCT Filed: Dec. 6, 2002

(86) PCT No.: PCT/DE02/04481

§ 371 (c)(1),
(2), (4) Date: Dec. 28, 2004

(87) PCT Pub. No.: WO03/050929

PCT Pub. Date: Jun. 19, 2003

(65) Prior Publication Data

US 2005/0082917 A1 Apr. 21, 2005

(30) Foreign Application Priority Data

Dec. 7, 2001 (AT) .............................. A 1927/2001
Mar. 6, 2002 (DE) ................................ 102 09 858

(51) Int. Cl.
*H02K 33/00* (2006.01)
(52) U.S. Cl. .......................................... 310/15; 310/24
(58) Field of Classification Search ............ 310/12–17, 310/24
See application file for complete search history.

(56) References Cited

U.S. PATENT DOCUMENTS 3,500,079 A * 3/1970 Barthalon ..................... 310/15

(Continued)

FOREIGN PATENT DOCUMENTS

CH         22962        5/1902

(Continued)

OTHER PUBLICATIONS

"air gap." Academic Press Dictionary of Science and Technology. 1992. Xreferplus. Jan. 31, 2007 http://www.xreferplus.com/entry/3068973.*

*Primary Examiner*—Karl Tamai
(74) *Attorney, Agent, or Firm*—Michael J. Striker (57) ABSTRACT

An electromechanical energy converter for a gaseous or vaporous medium comprising a stator (1) with two pot-shaped stator members (1a, 1b), each open at one end face and adjoining each other at these end faces, the stator members surrounding a working space (12) and forming a common magnetically permeated air gap (7) in which a coreless armature coil (25) is displaceably arranged. Arranged in the working space (12) is a freely oscillating piston (14) linked to the armature coil (25). Furthermore, at least one source (21a, 21b) for the medium, two reaction chambers (66a, 66b) each assigned to a head (15a, 15b) of the piston (14) and control means (17a, 19a, 22a, 23a; 17b, 19b, 22b, 23b) assigned to the reaction chambers (66a, 66b) for self-control of the piston oscillations are provided, by means of which the reaction chambers (66a, 66b) may be opened to the source (21a, 21b) during the piston oscillations for accepting medium under pressure, and to the working chamber (12) for releasing expanded medium (FIG. 11).

16 Claims, 10 Drawing Sheets

U.S. PATENT DOCUMENTS

| | | | | |
|---|---|---|---|---|
| 3,766,399 | A * | 10/1973 | Demetrescu | 290/40 R |
| 4,342,920 | A * | 8/1982 | Bucknam | 290/1 R |
| 4,439,699 | A * | 3/1984 | Brende et al. | 310/13 |
| 4,532,431 | A | 7/1985 | Iliev et al. | |
| 5,349,256 | A * | 9/1994 | Holliday | 310/12 |
| 6,199,519 | B1 * | 3/2001 | Van Blarigan | 123/46 R |
| 6,326,706 | B1 * | 12/2001 | Zhang | 310/12 |
| 6,759,755 | B2 * | 7/2004 | Sagov | 290/1 R |

FOREIGN PATENT DOCUMENTS

| | | |
|---|---|---|
| DE | 113 593 | 6/1975 |
| DE | 31 39 357 | 4/1983 |
| DE | 41 07 530 A1 | 9/1992 |
| DE | 43 15 046 A1 | 11/1994 |
| DE | 199 43 993 A1 | 3/2001 |
| EP | 0 185 656 B1 | 5/1989 |
| GB | 2299715 A * | 10/1996 |
| JP | 60243351 | 12/1985 |
| JP | 62155762 | 7/1987 |
| WO | 94/26019 | 11/1994 |

* cited by examiner

LINEAR GENERATOR WITH A SWINGING PISTON

CROSS-REFERENCE

The invention described and claimed hereinbelow is also described in PCT/DE 02/04481, filed on Dec. 6, 2002, A 1927/2001, filed in Austria on Dec. 7, 2001 and on DE 102 09 858.1, filed in Germany on Mar. 6, 2002. This Austrian Patent Application, whose subject matter is incorporated here by reference, provides the basis for a claim of priority of invention under 35 U.S.C. 119 (a)-(d).

BACKGROUND OF THE INVENTION

The invention concerns an electromechanical energy converter designed as a linear generator having a free piston.

In contrast to conventional electromechanical energy converters, linear generators with freely oscillating working pistons dispense with rotary movements and the crank drives needed for these. The energy conversion is provided by the back and forth linear movement of a working piston, often known as a free piston. The conversion of the mechanical energy into electrical energy takes place thereby that the working piston is provided with a plurality of magnets of alternating polarity and is arranged in a coil surrounding it (DD 113 593, DE 43 15 046 A1, DE 199 43 993 A1). A corresponding principle is applied to electromechanical converters that do not work as electrical generators, but as electrical linear motors (DE 41 07 530 A1) or that serve optionally for electrical or mechanical energy generation (EP 0 185 656 B1). Due to the plurality of permanent magnets mounted on the working piston and the inertia caused thereby, large accelerating and braking forces have to be applied, which result in low working frequencies. Normally for these so-called field displacers, magnet pairs arranged with mirror symmetry or rotational symmetry are used, in order, in the ideal case, to avoid lateral forces. Due to manufacturing tolerances, this is not fully achievable, however and the bearings are increasingly loaded through even the slightest wear. These loads then become exponentiated. Complex designs increase the proneness to faults, which militates against maintenance-free operation of the working piston over several years.

Energy converters of the aforementioned type have therefore become known (U.S. Pat. No. 4,532,431, WO 94/26019) whereby the working pistons are linked solely by a coreless armature coil, displaceably mounted in the air gap between two pot-shaped stator members arranged mutually opposed. Although an arrangement of this type offers significant advantages with regard to the accelerating and braking forces to be applied, energy converters of this type have previously not become established on the market. A main reason for this may be seen in the fact that the piston heads impinged upon by the gaseous or vaporous medium are displaceably mounted in chambers arranged outside the stator, whereby sealing problems arise which militate against operation of the piston free from faults and servicing over several years. Furthermore, it is not possible with these energy converters without further difficulty to guide the gaseous or vaporous medium round a circuit, to realise a compact and space-saving design, and to solve cooling problems arising during operation.

SUMMARY OF THE INVENTION

The technical problem to be solved by the present invention therefore consists in designing an electromagnetic energy converter of the aforementioned type such that, while avoiding the stated disadvantages, the occurrence of sealing problems are avoided and a simple space-saving design may be arrived at which enables very quiet operation over long, maintenance-free periods.

The invention brings with it the advantage that the gaseous or vaporous medium is conducted, after its expansion, into the working space surrounded by the stator. This enables the creation of a compact, closed system with a common cooling space which may be used, on the one hand, for cooling the components of the electromechanical converter (field coils, armature coil, etc.) and, on the other hand, for cooling and condensation of the gaseous or vaporous medium. Further advantages consist therein that the piston may be designed short and without special bearings, which enables lasting, maintenance-free running of the piston and no external chambers need to be provided, so that no sealing problems can arise.

BRIEF DESCRIPTION OF THE DRAWINGS

The invention will now be described in greater detail using embodiments illustrated in the drawings, in which.

DETAILED DESCRIPTION OF THE PREFERRED EMBODIMENTS

Figure 1:
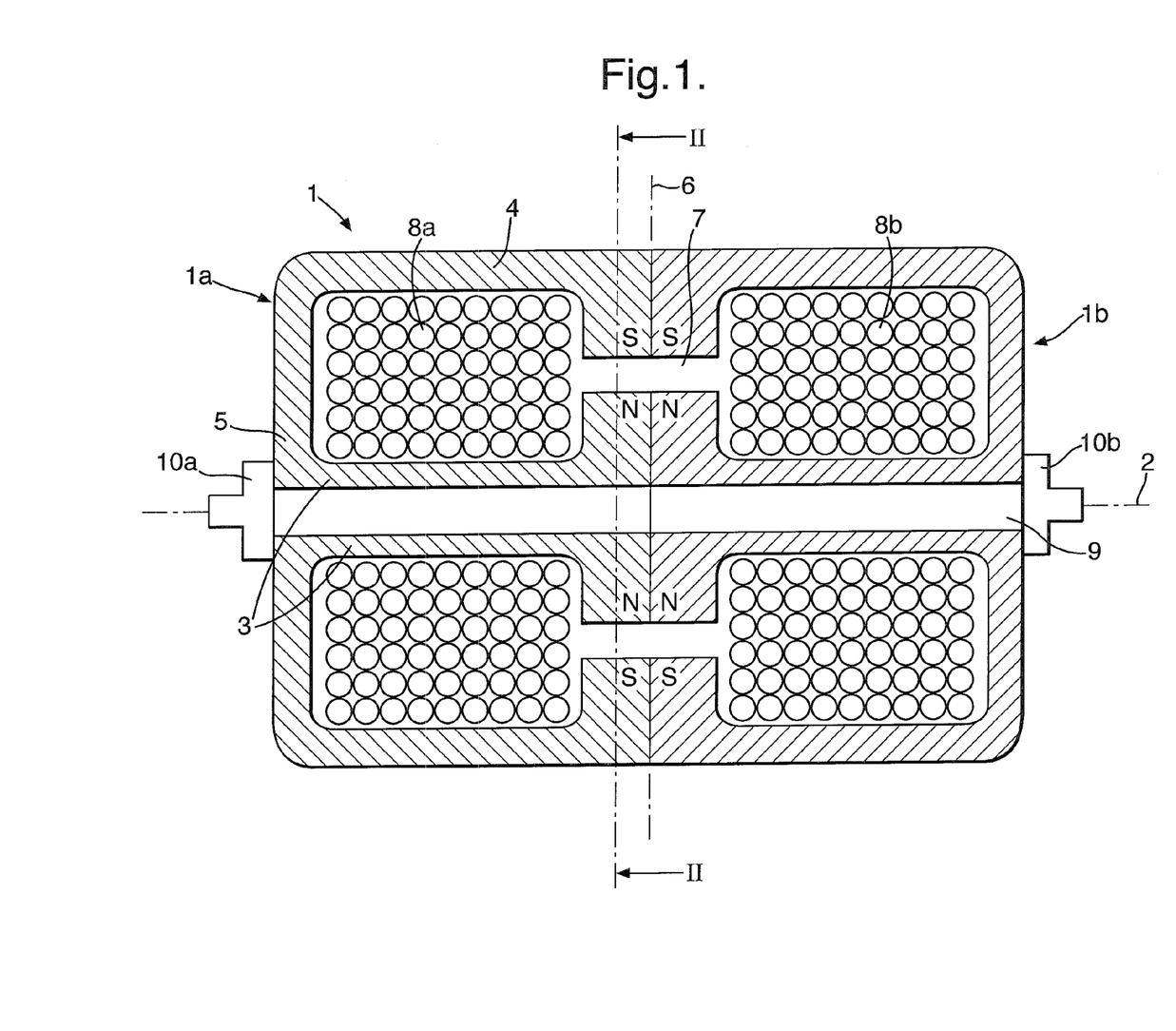
FIG. 1 shows the basic structure of the stator of an electromagnetic converter according to the invention in a schematic longitudinal section.
Figure 2:
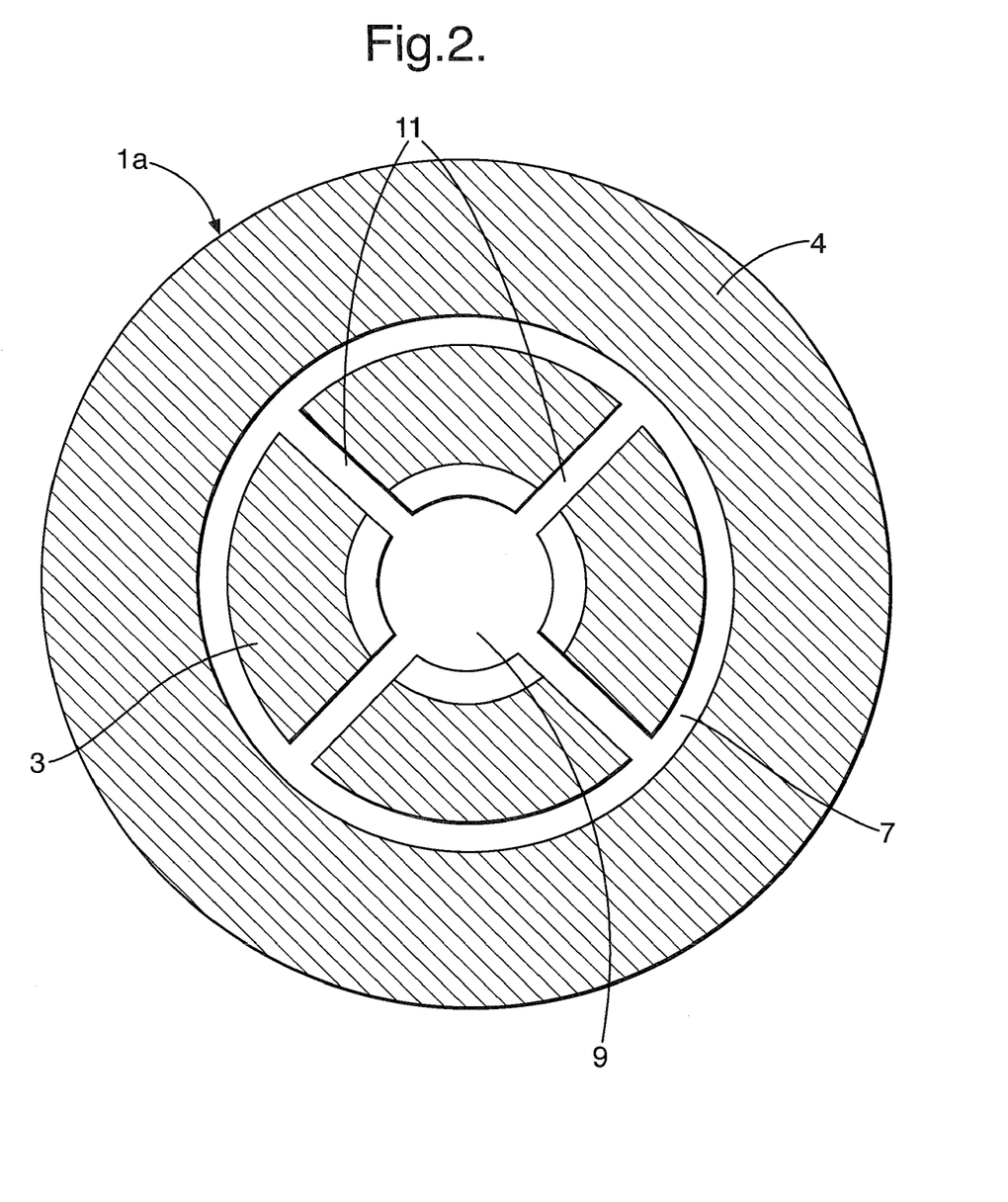
FIG. 2 shows a section along the line II-II in FIG. 1.

According to FIGS. 1 and 2, an electromechanical energy converter according to the invention has a stator 1 with two pot-shaped stator members 1a and 1b made of soft iron or similar. The stator member 1a contains a central pole piece 3 coaxial with a longitudinal axis 2 of the converter and an outer pole piece 4 surrounding it coaxially in annular fashion. The central pole piece 3 is preferably formed substantially cylindrical. On the other hand, the outer pole piece 4 is preferably designed as a hollow cylinder and closed by a base 5 at one end. At the open side opposing the base 5 of the pot thus formed, the two pole pieces 3, 4 suitably border a planar end face. Between the pole pieces 3, 4 is a peripheral annular gap. The stator member 1b is suitably formed identical to the stator member 1a and, like it, having rotational symmetry about the longitudinal axis 2.

As FIGS. 1 and 2 also show, the two stator members 1a, 1b adjoin each other with their end faces lying on the open sides along a plane of symmetry indicated by a line 6, so that on the one hand, they are arranged with mirror symmetry about the plane of symmetry 6 and, on the other hand, are arranged coaxial with the longitudinal axis 2. Their gaps arranged between the pole pieces 3, 4 therefore continue to an air gap identified overall with the reference number 7.

In a region between the central pole piece 3 and the outer pole piece 4, the stator members 1a, 1b have recesses in which are arranged windings 8a, 8b that are connected in a manner not shown in greater detail to a direct current source. The poling of the magnetic field generated by the windings 8a, 8b is chosen such that, for instance, a north pole N forms on the central pole piece 3 and on the outer pole piece 4, a south pole S forms (FIG. 1), although the polarity may also be reversed. Furthermore, it is clear that the stator 1 could also be excited by permanent magnets, in which case the windings 8a, 8b would be dispensed with.

Figure 6:
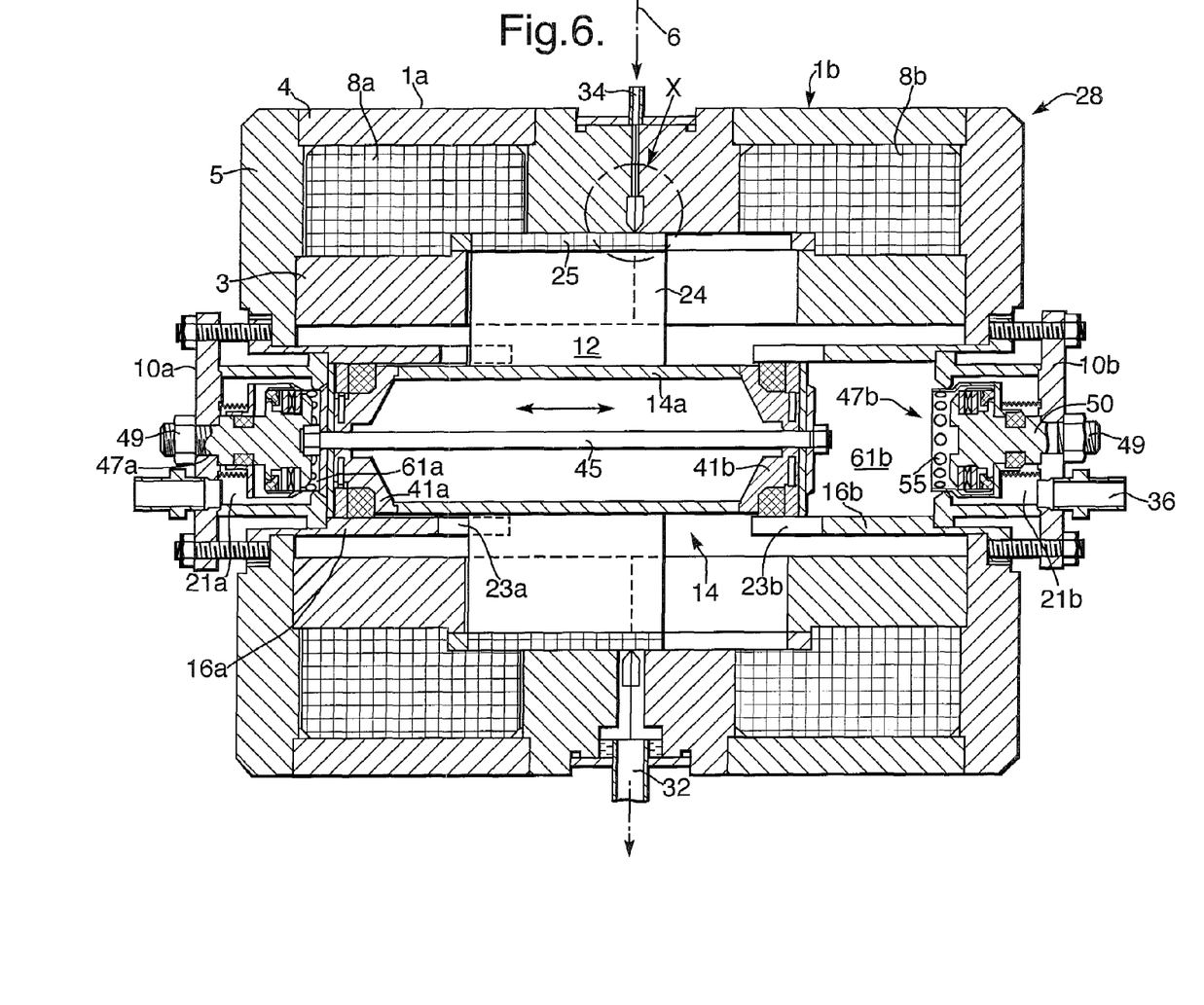
FIG. 6 shows a longitudinal section through an embodiment of a complete converter.

Finally, FIGS. 1 and 2 show that the central pole piece 3 of each stator member 1a, 1b is provided, on the one hand, with a central recess and, on the other hand, with slits 11 in a cruciform arrangement. The recesses are arranged coaxial with the longitudinal axis 2, each closed at their outer end with one schematically indicated cover 10a, 10b and formed axially continuous, so that they form a passageway 9 running between the covers 10a, 10b. The slits 11, however, run perpendicular to the plane of symmetry 6 and radially to the air gap 7 (FIG. 2), so that they link it to the passageway 9. By this means, in the central pole pieces 3, a coherent working space 12 comprising the passageway 9 and the slits 11 and only indicated in FIG. 6 is formed.

A substantial advantage of the two similarly made mutually abutting stator members 1a, 1b consists therein that outside the air gap 7, no stray fields arise. Rather, the field lines emanating from the two stator members 1a, 1b are squeezed back into the iron parts and therefore made fully effective in the air gap 7, so that it is evenly magnetically permeated over the entire length, leading to a high level of efficiency.

Figure 3:
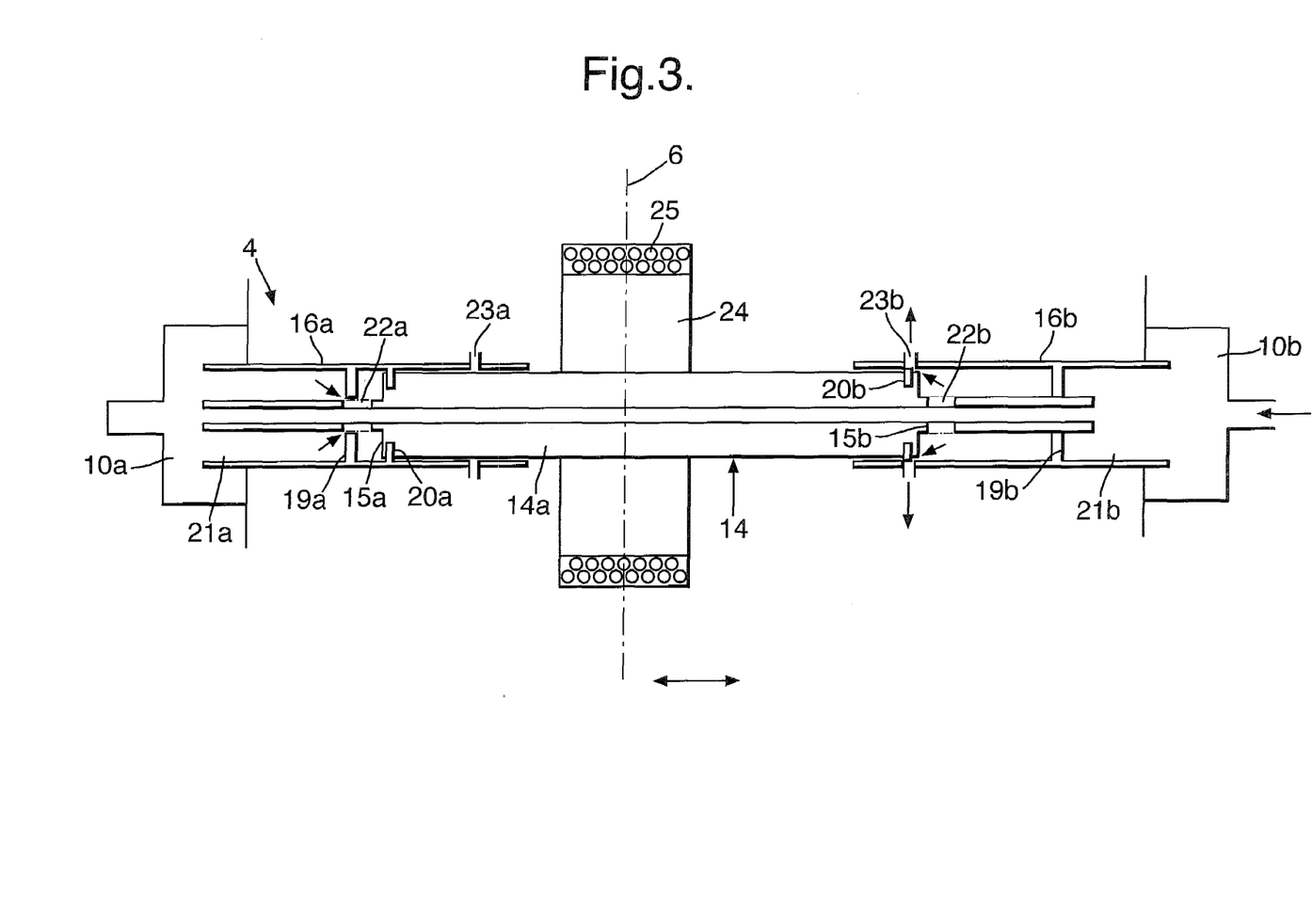
FIG. 3 shows, on a scale somewhat changed relative to FIG. 1, a longitudinal section through a working piston linked to an armature coil for the converter according to the invention.

FIG. 3 shows a freely oscillating piston 14 of the converter according to the invention to be arranged in the passageway 9. Like the passageway 9, the piston 14 preferably has a circular cross-section and is formed in a central section as a tube 14a. On its two ends, this tube 14a is closed by a piston head 15a, 15b and is mounted displaceable back and forth in two cylinder sections 16a, 16b, each with a sliding seating, whereby the cylinder sections 16a, 16b are sealed in the central recesses of the associated pole pieces 3 and fixed to them, for instance, with screws. The cylinder sections 16a, 16b may alternatively comprise a continuous cylinder, although for practical reasons they are separated in order that each cylinder section 16a, 16b may be individually removed axially for servicing and repair work and may be installed.

In the example, the piston 14, usually designated as a free piston, has coaxial guide shoulders standing outwards or sliders 17a, 17b of reduced cross-section, which are mounted coaxially displaceable in guide openings of end disks 19a, 19b arranged transversely in the cylinder sections 16a, 16b. Furthermore, the piston 14 is sealed relative to the cylinder sections 16a, 16b with the aid of circumferential seals 20a, 20b standing out radially close to the piston heads 15a, 15b radially spaced from its periphery, so that between the piston heads 15a, 15b and the associated covers 10a, 10b, compression chambers 21a, 21b are produced. These serve to receive a gaseous or vaporous medium in order to induce the piston 14 into a back and forth movement freely oscillating in known manner or—if the piston is driven—periodically to compress and expand the medium situated in the compression chambers 21a, 21b in the manner of a compressor or similar. The control of the movement of the piston 14 may be carried out, as is explained in greater detail below based on FIG. 11, for instance, with the aid of control slits 22a, 22b made in its outer jacket and arranged distributed round its periphery, the end disks 19a, 19b and by outlet slits 23a and 23b formed in the cylinder sections 16a, 16b, said outlets being formed on the ends of the cylinder sections 16a, 16b facing towards the plane of symmetry 6 and arranged distributed in the peripheral direction. The parts 17a, 17b, 19a, 22a, 22b, 23a and 23b represent the control means of a slider valve control system, explained below. It is important in this regard that the outlet slits 23a, 23b are open to the working space 12.

The piston 14 is provided in a central section with webs 24 projecting outwards and arranged in cruciform manner, whose form and size is so dimensioned that they may be accommodated by an allocated guide slit 11 and moved back and forth in it on moving the piston 14 back and forth. On their radially outer ends, the webs 24 are attached to the inside of an armature coil 25 to be arranged coaxially in the air gap 7, the size and form of said armature coil being so dimensioned that it is able to join, in the manner of a plunger coil, in axial movements of the working piston 14 in the air gap 7.

The armature coil 25 is substantially coreless according to the invention and is therefore of low weight, so that neither do large acceleration forces have to be applied, nor do radial transverse forces occur on movement of the armature coil 25 in the air gap 7. Furthermore, the piston 14, the webs 24 and the armature coil 25 comprise a coherent unit which, due to the use of a coreless armature coil 25 may also be designed relatively light, particularly if the piston 14 and the webs 24 are made, for instance, of aluminium, fibre composite material or similar. By this means, high working frequencies may be achieved in the practical implementation.

Figure 4:
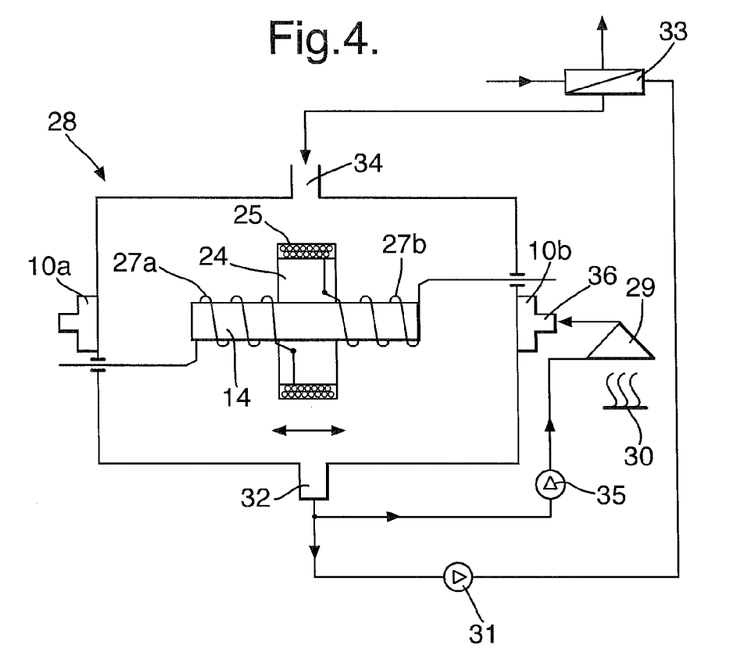
FIGS. 4 and 5 show schematic partial diagrams of two possible embodiments of a device operated with the converter according to the invention.

As FIG. 4 shows schematically, the piston 14 is surrounded by two springs 27a, 27b designed as helical springs, which are attached with their inner ends each to an allocated terminal of the armature coil 25, but which lead outwards with their outer ends out of the converter. Furthermore, the springs 27a, 27b are linked to the piston 14 and stationary parts in the working space 12, such that when the converter is not in operation, they define a central position of the piston 14 and the armature coil 15, which is favourable for a starting or running-up phase of the converter. The springs 27a, 27b therefore serve both as electrical connections for the armature coil 25, avoiding sliding contacts or similar, and also for centring it.

In the example shown in FIG. 4, a converter 28 designed according to the invention as shown in FIGS. 1 to 3 is illustrated as part of an electrical generator or similar, which may be used for instance, in a one or two-family house for additional electrical generating. In addition, applications in isolated operation (in huts, yachts, mobile homes or similar) or in countries without central electricity generation are also conceivable. In such cases, the converter 28 is operated with steam generated, for instance, in a boiler 29 to the required pressure of, for instance, 30 bar to 50 bar and the required temperature of between e.g. 200 C and 350 C. In this case, the boiler 29 is designed as an accessory component of a normal oil or gas burner 30 present anyway in heating systems for living accommodation, which may be used for operating a normal oil or gas heating system and whose flame may also be used for generating steam.

The converter 28 is preferably provided with two circuits linked within the converter, which both conduct steam or water, A first circuit serves as the coolant and/or lubricant circuit. It contains a pump 31, which draws coolant and/or lubricant flowing through the working space 12 of the converter 28, in this case water, from a removal line 32 formed in the stator 1 and feeds it to a heat exchanger 33 which, for instance, supports the heating of service water through a living accommodation heating system. The water cooled in the heat exchanger 33 is fed again to the converter 28 through a feed line 34 of the stator 1 as coolant and/or lubricant. The second circuit, on the other hand, contains a pump 35, which also draws water out of the converter 28 through the removal opening 32, but feeds it directly to the vaporiser 29, where it is vaporised again and is fed to a connector 36 in the cover 10a and/or 10b as a vaporous working medium. The steam serves to drive the piston 14, as explained below. Following the working operation, the steam condenses again to water and is collected in the free space 12 (FIG. 1) like the water used as coolant and/or lubricant and from there is fed again to the removal line 32. Both circuits are therefore unified in a common housing formed by the stator members 1a, 1b and the covers 10a, 10b and hermetically sealed against the outside.

The embodiment according to FIG. 5 differs from that according to FIG. 4 only in that the pump 35, as described below, is replaced by at least one piston pump installed in a bore in the central pole piece 3 and therefore directly integrated into a converter 37. In the embodiment according to FIG. 5, in each of the two central pole pieces 3, a piston pump 38a, 38b of this type is provided. In each case, one piston 39a, 39b of the piston pump 38a, 38b is preferably attached to one of the webs 24, whereby the pump stroke is synchronised with the stroke of the piston 14. Otherwise, in FIG. 5 the same reference numbers are used as in FIG. 4.

FIGS. 6 to 10 show further details of the converter 28 shown only schematically in FIGS. 1 to 4, so that similar parts are identified with the same numbers even where they show slight differences in comparison with FIGS. 1 to 4 and these differences are not of importance to the invention.

Figure 9:
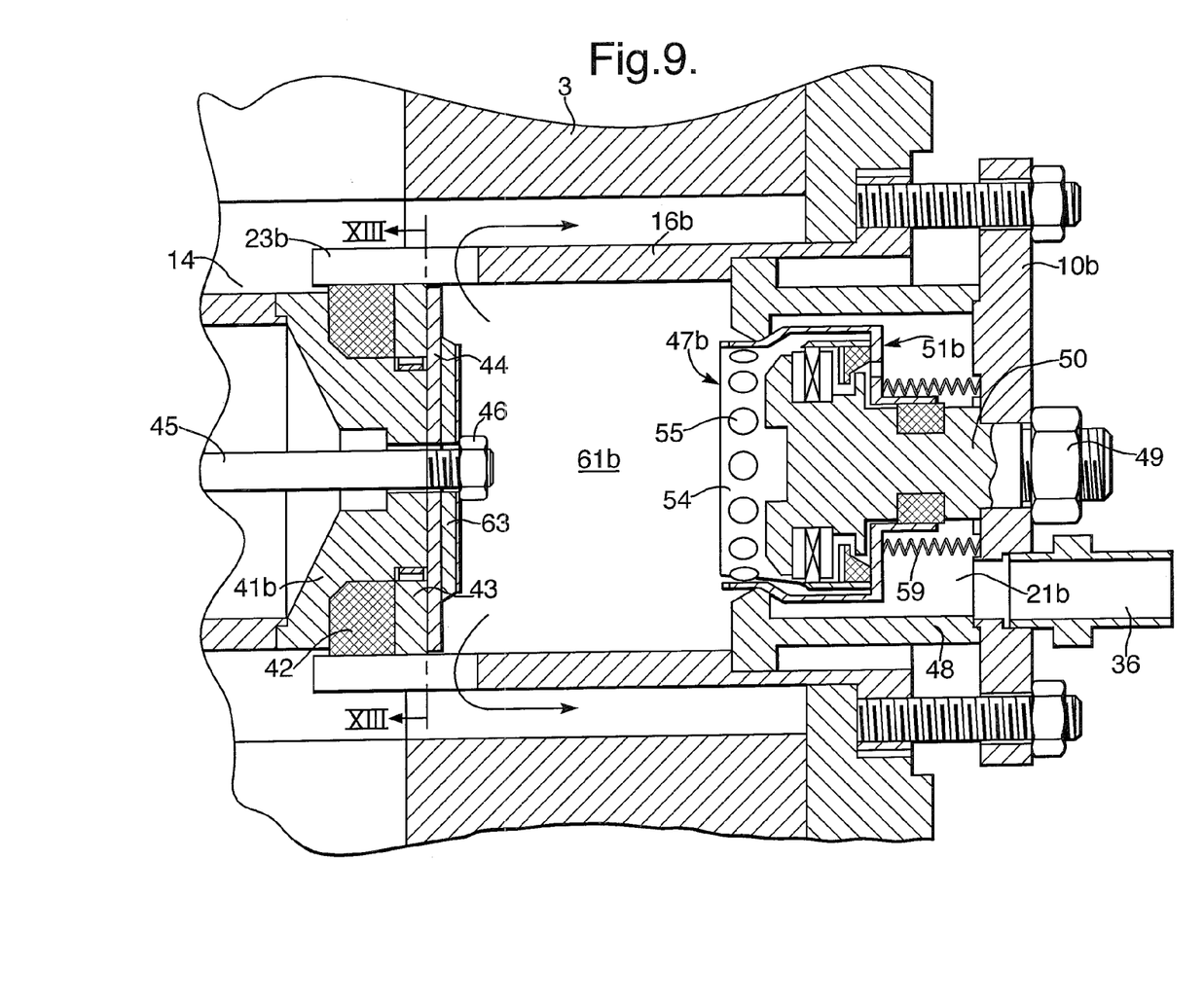
FIGS. 9 and 10 show a partial view of the converter according to FIG. 6 in two different operational positions of a working piston.

As distinct from FIG. 3, the tube 14a of the piston 14 is provided on the axial ends with two piston heads 41a, 41b, each of which has at its outer ends a circumferential groove into which a sealing ring 42 and a piston ring 43 are inserted (FIG. 9). Both are held in the groove by disks 44 lying against them from outside, whereby the two disks 44 are tensioned against the piston heads 41a, 41b by a rod 45 extending through the piston heads 41a, 41b and nuts 46 screwed onto its ends and thereby attached to said piston heads. The sealing ring 42 may act as a sliding bearing and support the sealing effect of the piston ring 43.

According to the embodiment illustrated in FIGS. 6 to 10, arranged in each of the axially inner ends of the compression chambers 21a, 21b shown in FIG. 3 is a valve 47a, 47b, each of which lies with mirror symmetry to the plane of symmetry 6 and preferably designed identically, so that only the valve 47b will be described in greater detail below. Both valves 47a, 47b serve the purpose of bringing about self-control of the oscillations of the working piston 14.

Figure 7:
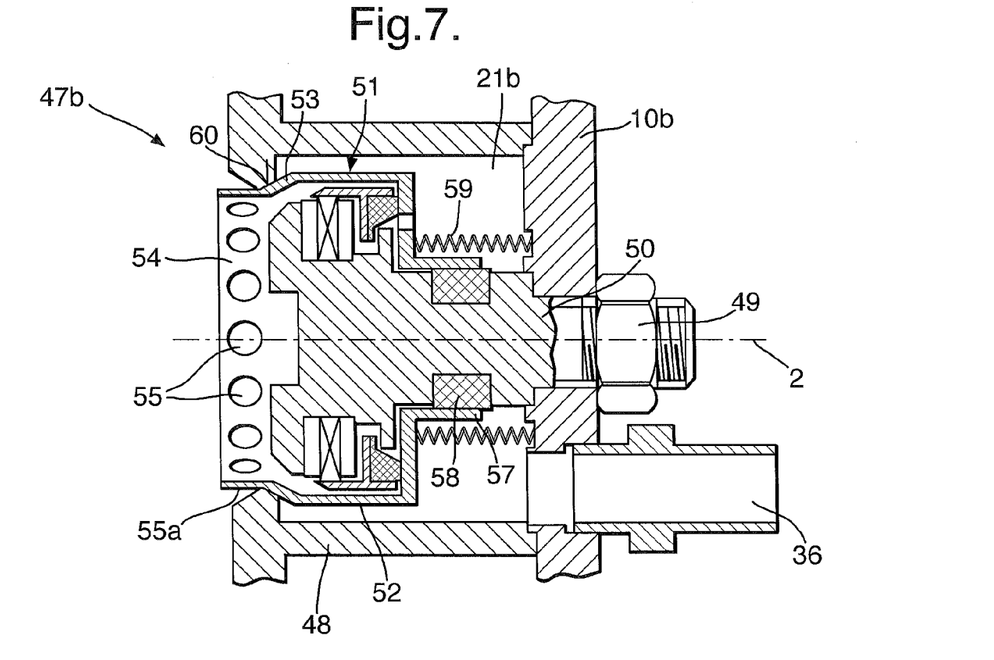
FIGS. 7 and 8 show a schematic section through a valve of the converter according to FIG. 6 in a closed position and an open position.
Figure 8:
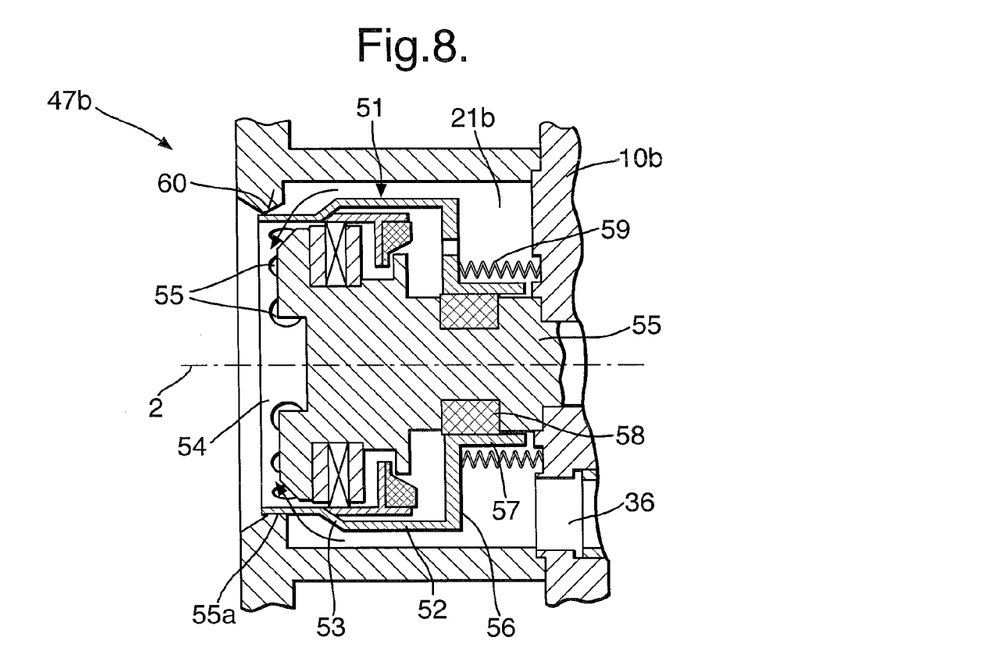

As is shown in particular by FIGS. 7, 8 and 9, the valve 47b contains a substantially hollow cylindrical housing 48 which is set coaxially and in sealed manner into the axially outer end of the cylinder section 16b and ends at the cover 10b. Situated coaxially in the housing 48 and fixed rigidly by means of a screw fixing 49 on the cover 10b is a substantially cylindrical guide body 50 on which is mounted a valve body 51 designed as a hollow cylinder displaceable parallel to the longitudinal axis 2. The valve body 51 contains a cylindrical jacket 52 (FIGS. 7, 8), which gives way towards the piston head 41b along a conical section 53 to a cylindrical end section 54 of reduced cross-section in which a plurality of openings 55 is formed. On its end remote from the end section 54, the valve body 51 is provided with a shoulder section 56 angled perpendicular to the longitudinal axis 2, which gives way to a guide section 57 arranged coaxially with the longitudinal axis 2. This is displaceably mounted on the guide body 50 by means of a sliding bearing 58, which also serves as a seal, fixed in the peripheral surface of the guide body 50 and tensioned in the direction of the associated piston head 41b by means of at least one compression spring 59 supported between the shoulder section 56 and the cover 10b.

The housing 48 is provided on its end facing towards the piston head 41b with a peripheral valve seating 60, whereby the arrangement is such that in a closed position of the valve 47T (FIG. 7) the valve body 51 is pressed with its conical section 53 against the valve seating 60 and is held in this closed position by the compression spring 59.

The connector 36 offset laterally from the longitudinal axis 2 in FIGS. 7 to 9 serves to introduce the gaseous or vaporous medium coming, for instance, from the vaporiser 29 (FIG. 4) into the compression chamber 21b surrounded by the housing 48. The chamber surrounds the guide body 50 and the valve body 51 in annular fashion and extends axially as far as the valve seating 60. If the valve 47b is in the closed position according to FIGS. 6, 7 and 9, the medium is unable to leave the compression chamber 21b, so that a reaction chamber or expansion chamber 61b axially enclosed in front of the valve 47b by the cylinder 16b remains substantially unpressurised. In this case, the openings 55 are all on a site within the reaction chamber 61b lying in the axial direction to the left of the valve seating 60.

Figure 10:
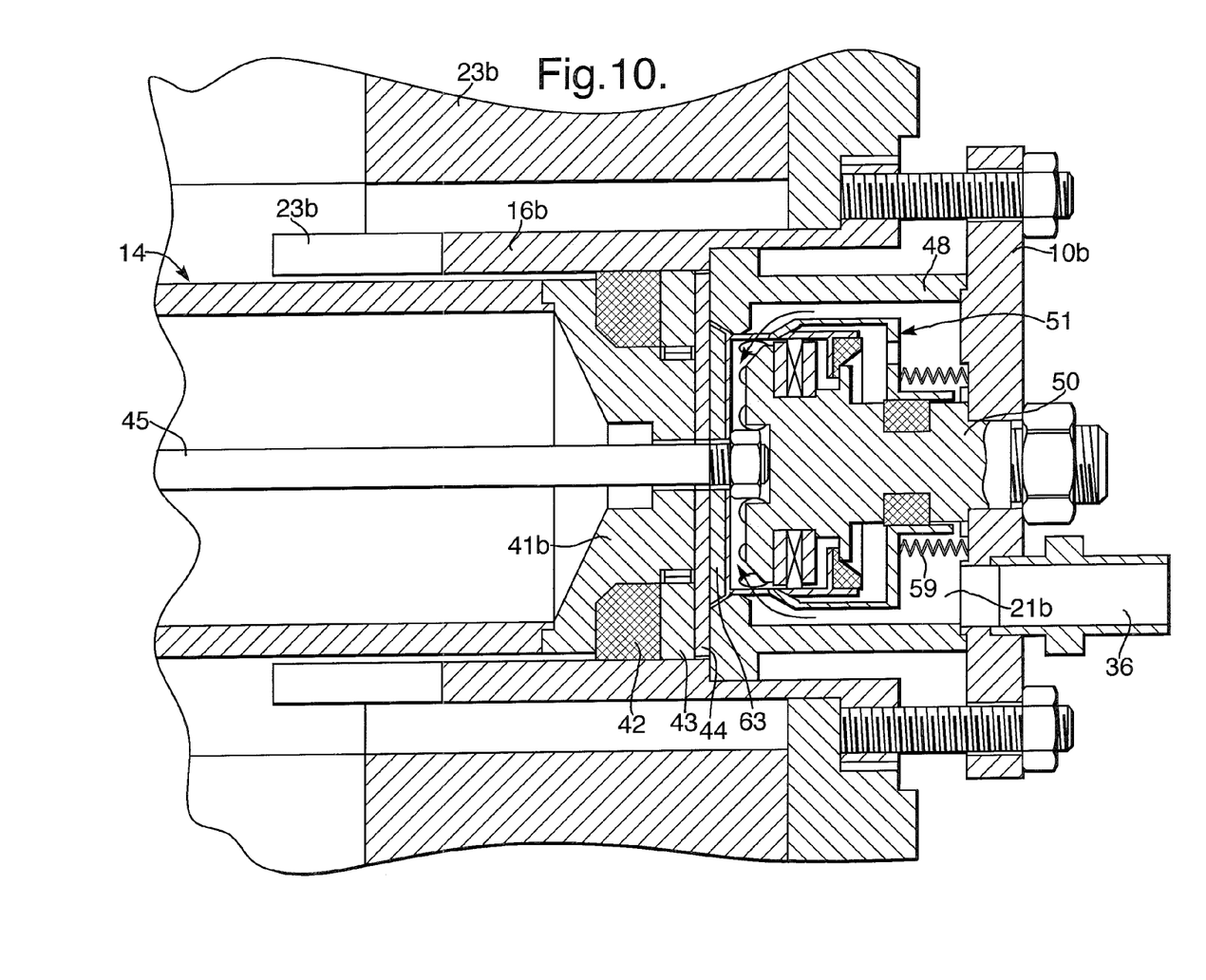

The valve body 51 may be pushed against the pressure of the compression springs 59 in FIG. 9 to the right into an open position apparent from FIGS. 8 and 10, whereby its guide section 57 slides on the sliding bearing 58. In the open position, the conical section 53 is lifted off the valve seating 60, whereby simultaneously the openings 55 come to lie at least partially on the right side of the valve seating 60 in FIG. 8, as is indicated in FIG. 8 for an opening 55a. As a result, the gaseous or vaporous medium may now flow in the direction of the arrows drawn in FIG. 8 out of the compression chamber 21b through the openings 55 and the end section 54 into the adjoining reaction chamber 61b.

The valve arrangement containing the valve 47a, which is arranged on the opposing side—the left in FIG. 6—of the piston 14, is correspondingly designed, though with mirror symmetry. Furthermore, the parts 23a, 23b, 47a, 47b represent the control means of a valve control system, whereby the outlet slits 23a, 23b are again open to the working space 12.

The mode of operation of the converter described on the basis of FIGS. 6 to 10 is substantially as follows:

In the rest position, the piston 14 and the armature coil 25 are in a central position created by the springs 27a, 27b (FIGS. 4, 5) in which both valves 47a, 47b are in the closed position. The converter is started in that a current is passed through the armature coil 25 from outside, which is dependent upon the load associated with the armature coil 25 and the power at which the current windings 8a, 8b are operated. The armature load may be adapted in advance depending upon the pressure of the working medium prevailing in the compression chambers 21a, 21b such that following the start-up process, optimum running of the piston 14 is achieved. Usually, a single defined stroke induced by this means suffices to bring the converter into motion, whereupon the current flow to the armature coil 25 is switched off. The required calculations are preferably carried out in a special starting box to which, for monitoring purposes, the present stroke position may be passed, measured for instance, with two stroke sensors 62 (FIG. 5) assigned to the piston 14 or the webs 24 or the armature coil 25.

It is assumed that the piston 14 moves to the right in FIGS. 6 to 10. It then reaches the end of its stroke close to the valve 47b, whereby any expanded gas residues in the reaction chamber 61b are compressed and ejected through the still open outlet slit 23b of the cylinder section 16b into the working space 12. Shortly thereafter, the outlet slit 23b is closed by the piston head 41b and the reaction chamber 61b is sealed by the piston ring 43.

As soon as the piston head 41b, with the constant reduction of the reaction chamber 61b, makes contact with the end section 54 of the valve 47b, the valve body 51 is moved to the right against the force of the springs 59 (FIG. 10). For this purpose, the piston head 41b may be provided with a contact plate 63 (FIGS. 9, 10) adapted to the form of the end section 54 of the valve body 51, said contact plate being arranged between the disk 44 and the nut 46. The right dead-centre point of the working piston 14 is reached (in FIG. 10), for instance, when the nut 46 makes contact with the bottom of a recess in the guide body 50.

As a result of the movement of the valve body 51 as described, the valve 47b is opened. The reaction chamber 61b is now open to the compression chamber 21b, so that the medium present in the latter may pass through the at least partially freed openings 55 into the reaction chamber 61b and may perform work there in that it pushes the piston 14 in FIG. 10 to the left and thereby enlarges the reaction chamber 61b once again. This continues initially until the valve body 51 is returned by the springs 59 into its closed position again.

On the left side of the converter in FIG. 6, corresponding processes are taking place. Through movement of the piston 14 to the right, the valve 47a is brought into the closed position and the reaction chamber 61a enlarged ever more until the piston head 41a finally frees the outlet slits 23a in the cylinder section 16a and the reaction chamber 61a is linked to the working space 12, in order to allow the expanded medium to flow into the working space 12. If therefore the piston 14 moves left as described, at the start of tis movement stroke, initially any residual gas left in the reaction chamber 61a is released through the outlet slits 23a into the working space 12, whereupon the outlet slits 23a are closed and the reaction chamber 61a is sealed by the seal 42 and the piston ring 43 of the piston head 41a. The processes described then repeat, since the piston 14 now moves in the direction of the left-hand dead-centre point, thereby opening the valve 47a and is again accelerated to the right by the steam arising in the left-hand compression chamber 21b. The reaction chambers 61a, 61b each serve in this process as a buffer or gas spring, since by correct dimensioning and arrangement of the outlet slits 23a, 23b, they ensure that the piston 14 does not impact hard at its dead-centre points against the guide bodies 50 of the valves 47a, 47b or other stationary part of the converter.

Since the armature coil 25 is firmly attached via the webs 24 to the piston 14, it is moved back and forth within the stator 1 in the rhythm of the piston 14, whereby in known fashion an alternating electrical current is generated, which may be tapped off by means of the springs 27a, 27b.

Figure 11:
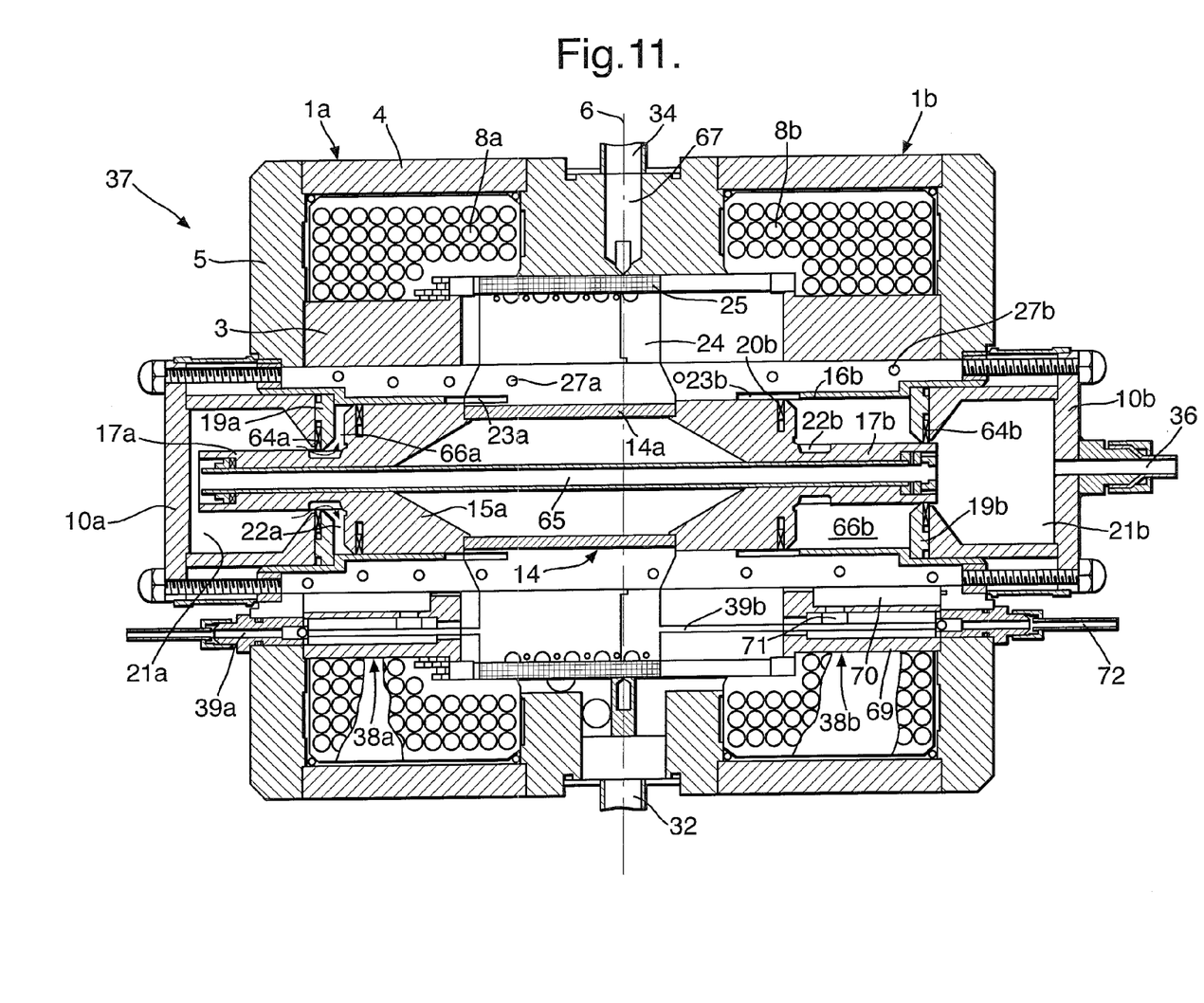
FIG. 11 shows a longitudinal section through a second embodiment of a complete converter.

The embodiment according to FIG. 11 shows details of the converter 37 designed according to FIGS. 1 to 3 and FIG. 5, so that the same reference numbers are used for the same parts even if these parts show slight differences compared with FIGS. 1 to 3 and FIG. 5.

In similar manner to FIG. 3, the piston 14 is provided at each end with a piston head 15a and 15b having sliders 17a, 17b directed axially outwards in whose peripheral surfaces the control slits 22a, 22b are formed. The control slits 22a, 22b take the place here of the valves 47a, 47b of the embodiments according to FIGS. 6 to 10 and together with the end disks 19a, 19b and the outlet slits 23a, 23b, comprise a slider valve control system for self-control of the piston oscillation. Otherwise, the control slits 22a, 22b are arranged on the sliders 17a, 17b such that during the back and forth movement of the piston 14, they interact with the sling rings 64a, 64b extending inwards and mounted in the end disks 19a, 19b.

A further difference from the embodiment according to FIGS. 6 to 10 consists therein that the two piston heads 15a, 15b and the adjoining sliders 17a, 17b are passed through by a continuous coaxial tube 65, which links the two compression chambers 21a, 21b in every position of the piston 14 so as to allow through-flow. Therefore only one of the two connectors 36 in the covers 10a and 10b is provided for feeding in the gaseous or vaporous working medium, whilst the other connector 36 is closed. Depending upon the spatial circumstances, one or other of the connectors 36 may be selected for feeding in the working medium. In any event, the working medium enters into the relevant compression chamber 21b on one side and, on the other side, also through the tube 65 into the other compression chamber 21a or vice versa, so that substantially the same gas or steam pressure prevails in both.

The operational method of the embodiment according to FIG. 11 is substantially as follows.

After the starting procedure which takes place similarly to FIGS. 6 to 10, the piston 14 is situated, for instance, according to FIG. 1I in its left-hand dead-centre position. In this position, the control slits 22a are arranged on either side of the sealing ring 64a and therefore open partially to the compression chamber 21a and partially to the reaction chamber 66a, which is situated between the end disk 19a and the associated piston head 15a. The pressurised medium may therefore enter in the direction of the arrow into the reaction chamber 66a, thereby act on the piston head 15a and move the entire piston 14 in FIG. 11 to the right. After a distance dependent upon the axial length of the control slits 22a, these are situated entirely on the right side (in FIG. 11) of the sealing ring 64a or the end disk 19a, so that now only the medium in the reaction chamber 66a is able to act on the piston head 15a.

Similarly to the above description of the first embodiment, in this phase the outlet slits 23b on the opposing side are still open, so that in a reaction chamber 66b situated there, any residual expanded gas is able to be ejected through the outlet slits 23b into the working space 12. However, after a certain movement of the piston 14 to the right, the outlet slits 23b are closed by the associated piston head 15b, whereupon the piston rings 20b lie against the cylinder section 16b. At the same time, the sealing ring 64b still lies against the associated right-hand slider 17b, so that the reaction chamber 66b is hermetically sealed and the gaseous or vaporous medium cannot enter it.

On further movement of the working piston 14 to the right, the left-hand reaction chamber 66a is increasingly enlarged, whereas the right-hand reaction chamber 65b is increasingly diminished, forming a buffer, whereby a hard impact of the piston head 15b against the end disk 19b is avoided. Shortly before this impact, the control slits 22b also reach the region of the sealing ring 64b, until finally they make a flow connection between the compression chamber 21b and the reaction chamber 66b and the movement direction of the piston 14 is therefore gradually reversed. The same process steps are then repeated as described above for the left side of the converter 37.

Figure 5:
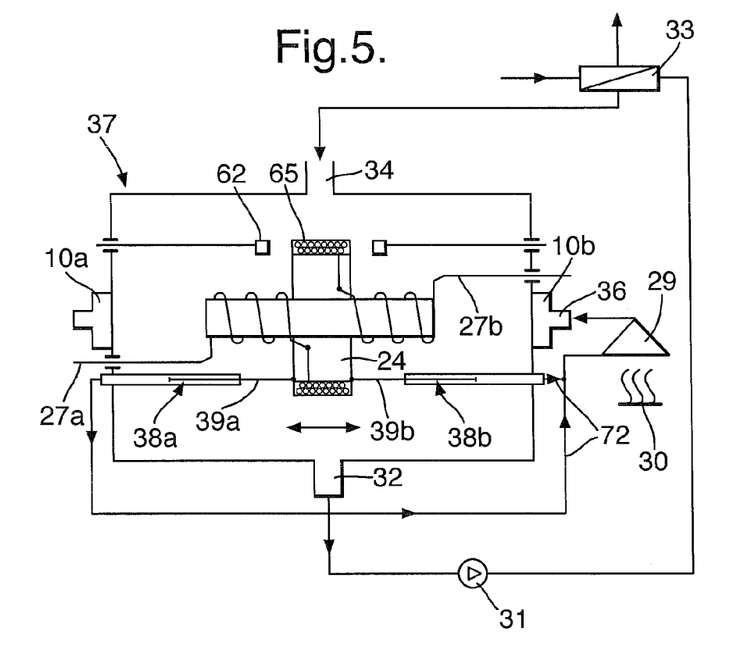
Figure 12:
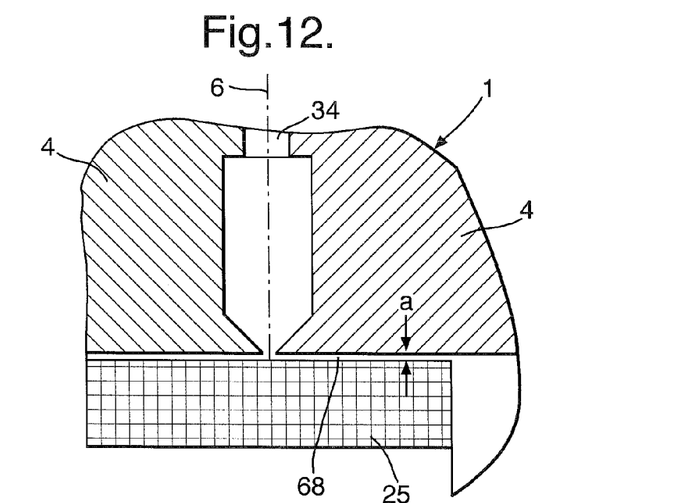
FIG. 12 shows an enlarged detail X of FIG. 6 with a supply line for a coolant and/or lubricant.

As FIG. 11 also shows, the coolant and/or lubricant, which is introduced according to FIGS. 4 and 5 via the feed line 34 into the stator 1, passes via a channel 67 formed in said stator into an annular chamber 68 with a radial depth, shown enlarged in FIG. 12 and situated between the pole pieces 4 and the armature coil 25. The coolant and lubricant can therefore flow round the armature coil 25 and the pole pieces 4 in the peripheral direction, and thus cool these and the windings 8a, 8b until it passes over the axial ends of the armature coil 25 into the working space 12 and is removed from it via the removal line 32.

FIG. 11 also shows that arranged close to each of the compression chambers 21a, 21b and beneath them, is one of the piston pumps 38a, 38b according to FIG. 5.

Each of these piston pumps 38a, 38b contains a cylinder 69 formed in the central pole piece 3 and made from a bore, above which is a collecting duct 70 provided on the floor of the working space 12, said collecting duct being connected to the cylinder 69 via an opening 71. In the cylinder 69, a piston (not shown in greater detail) may also move back and forth with the associated piston rod 39a, 39b.

Part of the water used as coolant and lubricant and the water that arises in the working space 12 through condensation of the steam entering through the outlet slits 23a, 23b is able to pass in this embodiment via the collecting ducts 70 and the opening 71 into the cylinder 69 and out of it through a removal line 72 according to FIGS. 5 and 11 to the vaporiser 29. The vaporiser therefore always has enough water available (e.g. 0.3 to 0.5 l/min) for generating the steam needed in the converter 37 without an additional external feed water pump being required. It should be understood that the piston pumps 38a, 38b are also provided with all the necessary valves or similar required for carrying out the pump strokes performed in the rhythm of the movement of the piston 14.

Figure 13:
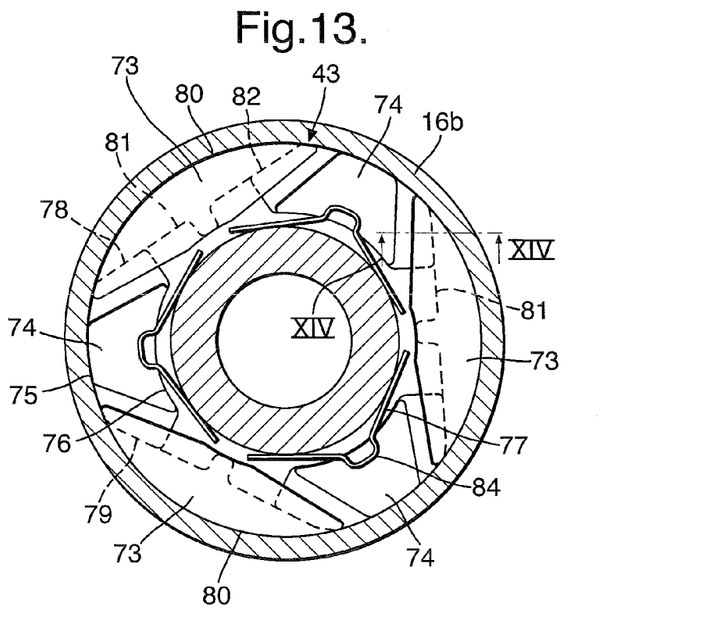
FIG. 13 shows a section along the line XIII-XIII in FIG. 9.
Figure 14:
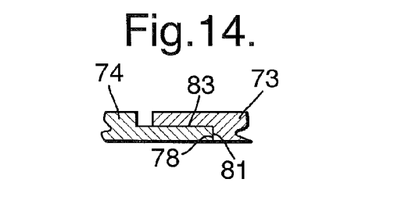
FIG. 14 shows a section along the line XIV-XIV in FIG. 13.

FIGS. 13 and 14 show a preferred embodiment of the piston ring 43 illustrated in FIG. 9, arranged between the piston head 41b and the cylinder 16b. In the interests of the longest possible service life and of simple servicing as soon as the wear limit is reached, the piston rings 43 are made up from a series of overlapping mutually displaceable elements. The wedge-shaped elements 74 may advantageously be made from softer material than the circular segment-shaped elements 73. By this means, a lasting seal against the cylinder wall 16b is ensured. As FIG. 13 shows, first circular segment-shaped elements 73 alternate in the circumferential direction with second wedge-shaped elements 74. In the embodiment three elements 73 and three elements 74 lying between them are provided. The wedge-shaped elements 74 are substantially trapezium-shaped, whereby a shorter side serving as a sealing surface 75 coming to lie against the inner lining of the surrounding cylinder 16b is rounded according to the internal contour of the cylinder section 16b, whilst the longer side 76 lies opposed to the associated cylinder head 41b. Between the two is a roof-shaped spring 77 formed for instance as a leaf spring, which presses the element radially outwards and keeps it in contact with the cylinder section 16b. The two limbs 78 and 79 of the element 74 linking the sides 75, 76 are formed wedge-shaped and run towards each other from the inside to the outside.

The circular segment-shaped elements 73 are also formed as sealing surfaces 80 on their side facing away from the piston head 41b and adapted to the inner contour of the cylinder section 16b. They also have driving surfaces 81, 82 facing towards the limbs 78, 79 and lying against these. This brings the advantage that the elements 74 which are pretensioned radially outwards by the springs 77 also act with their limbs or wedge surfaces 78, 79 upon the driving surfaces 81, 82 of the adjacent elements 73 and therefore also press their sealing surfaces 80 radially outwards against the inner wall of the cylinder section 16b. The elements 73, 74 are thereby automatically radially adjusted in the event of wear of the sealing surfaces 75, 80.

The elements 73, 74 are arranged such that no gap arises on the sliding surfaces. In the region of the elements 73, 74, these sliding surfaces are arranged overlapping as is shown in particular in FIG. 14. Each element 73, 74 has, for instance, half the wall thickness in an overlapping zone 83 formed thereby.

The roof-shaped springs 77 are preferably clipped into appropriate recesses in the elements 74 with eyes 84 provided in the roof region and thereby releasably linked to it, whilst the support surfaces of their limbs suitably lie in grooves formed in the jacket of the piston head 41b. Otherwise it is clear that the piston head 41a may be provided with a corresponding piston ring 43 and that the piston rings 64a, 64b according to FIG. 1 may be designed substantially like the piston rings 43.

The cylinder sections are preferably made from steel or artificial carbon infiltrated with antimony, whilst the piston ring elements 73, 74 are made, for instance, from softer material, which wears faster relative to the cylinder sections. This ensures that on servicing, only the rings that are more easily changed have to be replaced.

The invention is not restricted to the embodiments described, which may be altered in many ways, although the design described brings with it the advantage of an arrangement that is very simple to realise and small in size. For instance, in place of the described valve and slider control systems, other control systems may also be provided. In particular, the piston 14, in place of being operated with steam, may also be driven with combustion gases or common fuels, such as petrol or similar, in which case, the gases introduced into the compression chambers have to be ignited or exploded at the desired rate. It would also be possible to design the sealing rings (e.g. 64a, 64b) provided in the cylinder sections 16a, 16b similarly to the piston rings according to FIGS. 13 and 14 in order that they function like these and adjust themselves in the event of wear. However, in this case springs, for instance annular springs must be provided, acting radially inwards instead of radially outwards. It is also possible to leave out the spaces identified as compression chambers 21a, 21b all together and only regard the connection ports 36 and/or hoses linked to these as compression chambers. It is important for the function described only that the compression chambers 21a, 21b each represent sources or supply devices for the medium under pressure and are opened to the reaction chambers at the right time points. The sources may therefore also be realised with devices which directly generate the medium under pressure. Further, FIGS. 6 and 11, particularly show that the covers 10a, 10b may also be arranged with axial separations from the bases 5 of the pole piece 4 and the cylinders 16a, 16b may be axially displaced further outwards. In this connection it is important only that the outlet slits 23a, 23b open in some manner into the working space 12 in order always to guide the expanded medium into it (see also FIGS. 4 and 5), and that the covers 10a, 10b or the bases 5 are not perforated by moving parts such as, for instance, the piston 14, which would lead to sealing problems. Finally, it is evident that the various features may also be used in other combinations than those shown and described.

The invention claimed is:

1. Electromechanical energy converter for a gaseous for vaporous medium comprising a stator (1) with two pot-shaped stator members (1a, 1b), each open at one end face and adjoining each other at these end faces with mirror symmetry along a plane of symmetry (6), said stator members surrounding a working space (12) and forming a common magnetically permeated air gap (7), a coreless armature coil (25) displaceably arranged in the air gap (7), a freely oscillating piston (14) arranged in the working space (12) linked to the armature coil (25), at least one source (21a, 21b) for the medium, two reaction chambers (61a, 66a; 61b, 66b) each assigned to a head (15a, 15b; 41a, 41b) of the piston (14) and control means (17a, 19a, 22a, 23a, 47a; 17b, 19b, 22b, 23b, 47b) assigned to the reaction chambers (61a, 66a; 61b, 66b) for self-control of the piston oscillations, and by means of which the reaction chambers (61a, 66a, 61b, 66b) may be opened to the source (21a, 21b) during the piston oscillations for accepting medium under pressure, and to the working space (12) for releasing expanded medium, wherein the stator members (1a, 1b) are formed with rotational symmetry about a longitudinal axis (2) of the piston (14), wherein the central pole pieces (3) are each provided with a passageway (9) coaxial with the longitudinal axis (2), surrounding the working space and accommodating the piston (14) and the armature coil (25) is linked to the piston (14) via radial, inwardly projecting webs (24), wherein inserted in sealed manner in every passageway (9) is a closed cylinder section (16a, 16b) coaxial with the longitudinal axis (2) and closed to the outside with a cover (10a, 10b) and the piston (14) is provided on each of its ends with a piston head (15a, 15b; 41a, 41b) in an assigned cylinder section (16a, 16b) sealed and displaceably mounted, such that between each of the covers (10a, 10b) and the associated piston head (15a, 15b; 41a, 41b), a compression chamber comprising the source (21a, 21b) of the gaseous or vaporous medium comes into existence, and wherein the two compression chambers (21a, 21b) are linked together so as to permit flow, via a hollow space (45) passing through the working piston (14).

2. Energy converter according to claim 1, wherein the stator members (1a, 1b) each have a central pole piece (3) and an outer pole piece (4) surrounding it.

3. Energy converter according to claim 1, wherein at least one of the covers (10a, 10b) is provided with a connector (36) for supply and/or removal of the medium.

4. Energy converter according to claim 1, wherein the control means (17a, 19a, 22a, 23a, 47a; 17b, 19b, 22b, 23b, 47b) are designed in the manner of a valve and/or slider valve control system.

5. Energy converter according to claim 4, wherein the control means (17a, 19a, 22a, 23a, 47a; 17b, 19b, 22b, 23b, 47b) have outlet slits (23a, 23b) arranged on the axially inner ends of the two cylinder sections (16a, 16b) for the medium and the piston heads (15a, 15b; 41a, 41b) have sealing means (20a, 20b; 43) assigned to them.

6. Energy converter according to claim 4, wherein the valve control system contains a valve (47a, 47b) arranged in each of the cylinder sections (16a, 16b) and actuatable by the associated piston head (41a, 41b).

7. Energy converter according to claim 1, wherein the stator (1) has at least one feed line or removal line (34, 32) opening into the working space (12) for feeding or removal of a coolant and/or lubricant.

8. Energy converter according to claim 1, wherein the armature coil (25) is linked to the piston (14) through slits (11) in the stator.

9. Electromechanical energy converter for a gaseous for vaporous medium comprising a stator (1) with two pot-shaped stator members (1a, 1b), each open at one end face and adjoining each other at these end faces with mirror symmetry along a plane of symmetry (6), said stator members surrounding a working space (12) and forming a common magnetically permeated air gap (7), a coreless armature coil (25) displaceably arranged in the air gap (7), a freely oscillating piston (14) arranged in the working space (12) linked to the armature coil (25), at least one source (21a, 21b) for the medium, two reaction chambers (61a, 66a; 61b, 66b) each assigned to a head (15a, 15b; 41a, 41b) of the piston (14) and control means (17a, 19a, 22a, 23a, 47a; 17b, 19b, 22b, 23b, 47b) assigned to the reaction chambers (61a, 66a; 61b, 66b) for self-control of the piston oscillations, and by means of which the reaction chambers (61a, 66a, 61b, 66b) may be opened to the source (21a, 21b) during the piston oscillations for accepting medium under pressure, and to the working space (12) for releasing expanded medium, wherein the control means (17a, 19a, 22a, 23a, 47a; 17b, 19b, 22b, 23b, 47b) are designed in the manner of a valve and/or slider valve control system, and wherein the slide valve control system has control slits (22a, 22b) formed in the periphery of the piston heads (15a, 15b) and the cylinder sections (16a, 16b) are provided with sealing means (64a, 64b) assigned to said cylinder sections.

10. Electromechanical energy converter for a gaseous for vaporous medium comprising a stator (1) with two pot-shaped stator members (1a, 1b), each open at one end face and adjoining each other at these end faces with mirror symmetry along a plane of symmetry (6), said stator members surrounding a working space (12) and forming a common magnetically permeated air gap (7), a coreless armature coil (25) displaceably arranged in the air gap (7), a freely oscillating piston (14) arranged in the working space (12) linked to the armature coil (25), at least one source (21a, 21b) for the medium, two reaction chambers (61a, 66a; 61b, 66b) each assigned to a head (15a, 15b; 41a, 41b) of the piston (14) and control means (17a, 19a, 22a, 23a, 47a; 17b, 19b, 22b, 23b, 47b) assigned to the reaction chambers (61a, 66a; 61b, 66b) for self-control of the piston oscillations, and by means of which the reaction chambers (61a, 66a, 61b, 66b) may be opened to the source (21a, 21b) during the piston oscillations for accepting medium under pressure, and to the working space (12) for releasing expanded medium, wherein the armature coil (25) is linked to at least one spring (27a, 27b) serving both for current supply and removal and for centering.

11. Electromechanical energy converter for a gaseous for vaporous medium comprising a stator (1) with two pot-shaped stator members (1a, 1b), each open at one end face and adjoining each other at these end faces with mirror symmetry along a plane of symmetry (6), said stator members surrounding a working space (12) and forming a common magnetically permeated air gap (7), a coreless armature coil (25) displaceably arranged in the air gap (7), a freely oscillating piston (14) arranged in the working space (12) linked to the armature coil (25), at least one source (21*a*, 21*b*) for the medium, two reaction chambers (61*a*, 66*a*; 61*b*, 66*b*) each assigned to a head (15*a*, 15*b*; 41*a*, 41*b*) of the piston (14) and control means (17*a*, 19*a*, 22*a*, 23*a*, 47*a*; 17*b*, 19*b*, 22*b*, 23*b*, 47*b*) assigned to the reaction chambers (61*a*, 66*a*; 61*b*, 66*b*) for self-control of the piston oscillations, and by means of which the reaction chambers (61*a*, 66*a*, 61*b*, 66*b*) may be opened to the source (21*a*, 21*b*) during the piston oscillations for accepting medium under pressure, and to the working space (12) for releasing expanded medium, wherein the stator (1) has at least one feed line or removal line (34, 32) opening into the working space (12) for feeding or removal of a coolant and/or lubricant, and wherein the removal line (32) is provided with at least two outlets and the working space (12) is connected via a collecting duct (70) and a pump (38*a*, 38*b*) to at least one of the outlets.

12. Energy converter according to claim 11, wherein the pump (38*a*, 38*b*) is a piston pump having a pump piston (39*a*, 39*b*) integrated in the stator (1) and the pump piston (39*a*, 39*b*) is linked in driving manner to the working piston (14).

13. Energy converter according to claim 11, wherein it contains a vaporiser (29) having an outlet linked to the connector (36) of the cover (10*a*, 10*b*), that the medium is water vapour and that the first outlet linked to the pump (38*a*, 38*b*) is linked to an inlet of the vaporiser (29).

14. Energy converter according to claim 11, wherein the coolant and/or lubricant is water and at least one second outlet is linked via a further pump (31) to a heat exchanger (33) connected to the feed line (34).

15. Electromechanical energy converter for a gaseous for vaporous medium comprising a stator (1) with two pot-shaped stator members (1*a*, 1*b*), each open at one end face and adjoining each other at these end faces with mirror symmetry along a plane of symmetry (6), said stator members surrounding a working space (12) and forming a common magnetically permeated air gap (7), a coreless armature coil (25) displaceably arranged in the air gap (7), a freely oscillating piston (14) arranged in the working space (12) linked to the armature coil (25), at least one source (21*a*, 21*b*) for the medium, two reaction chambers (61*a*, 66*a*; 61*b*, 66*b*) each assigned to a head (15*a*, 15*b*; 41*a*, 41*b*) of the piston (14) and control means (17*a*, 19*a*, 22*a*, 23*a*, 47*a*; 17*b*, 19*b*, 22*b*, 23*b*, 47*b*) assigned to the reaction chambers (61*a*, 66*a*; 61*b*, 66*b*) for self-control of the piston oscillations, and by means of which the reaction chambers (61*a*, 66*a*, 61*b*, 66*b*) may be opened to the source (21*a*, 21*b*) during the piston oscillations for accepting medium under pressure, and to the working space (12) for releasing expanded medium, wherein the control means (17*a*, 19*a*, 22*a*, 23*a*, 47*a*; 17*b*, 19*b*, 22*b*, 23*b*, 47*b*) are designed in the manner of a valve and/or slider valve control system, wherein the control means (17*a*, 19*a*, 22*a*, 23*a*, 47*a*; 17*b*, 19*b*, 22*b*, 23*b*, 47*b*) have outlet slits (23*a*, 23*b*) arranged on the axially inner ends of the two cylinder sections (16*a*, 16*b*) for the medium and the piston heads (15*a*, 15*b*; 41*a*, 41*b*) have sealing means (20*a*, 20*b*; 43) assigned to them, and wherein at least the sealing means (20*a*, 20*b*; 43) allocated to the piston heads (15*a*, 15*b*; 41*a*, 41*b*) comprise piston rings projecting radially from the piston heads (15*a*, 15*b*; 41*a*, 41*b*) and assembled from mutually displaceable elements (73, 74) arranged overlapping.

16. Energy converter according to claim 15, wherein the elements (73, 74) comprise, in the peripheral direction of the piston rings (20*a*, 20*b*; 43), alternating circular segment-shaped first elements (73) and second elements (74) radially pretensioned by springs (77), said second elements having wedge surfaces (78, 79) acting on the first elements (73).

\* \* \* \* \*